Dec. 25, 1962    R. W. EMERY    3,069,744
MOULDING METHOD
Filed Dec. 7, 1959    3 Sheets-Sheet 1

INVENTOR
ROY W. EMERY

BY Featherstonhaugh & Co.
ATTORNEYS

INVENTOR
ROY W. EMERY
ATTORNEYS

United States Patent Office 3,069,744
Patented Dec. 25, 1962

3,069,744
MOULDING METHOD
Roy W. Emery, 1 Donino Court, Toronto, Ontario, Canada
Filed Dec. 7, 1959, Ser. No. 857,624
Claims priority, application Great Britain June 5, 1959
7 Claims. (Cl. 25—155)

This invention relates to a method of moulding long hollow articles by the building up of a body of moulding material on a composite rigid core mould and subsequently removing the core mould from the moulded article. Particularly, the invention is concerned with the removal of the mould from the long hollow void in the body of the moulded article.

The importance and economic value of being able to mould long hollow articles has been realized for many years as exemplified by a moulding process devised by Ralph S. Frobisher and others and described in U.S. Patent No. 1,861,849. In that disclosure, a body of moulding material is forced into an annular space through a series of perforations in the inner one of two concentric mould elements which together define the annular space. The process does not give a uniform density of product, and has a further limitation in that the side walls of the product must be relatively thick. The process is generally uneconomic.

Tubes of large diameter, such as large culvert pipe and tunnel linings, are moulded on core moulds made up from a number of parts, which are then collapsed or separated for removal. Flexible inflatable core moulds are used to mould long narrow voids in such articles as hollow concrete floor panels and short lengths of small culvert pipe, where the heavy walls and the rough nature of the product are such that the rigid control of straightness and dimensional accuracy provided by a rigid core mould are not required.

On the other hand, the vacuum moulding from paper pulp of short tubular articles such as hats, flower pots and minnow buckets is accomplished on rigid cores, and a reversal of fluid pressure differential such as the alternation of vacuum with the application of compressed air is normally employed to blow the product off or expand it away from the mould. In a further method of removing the product described in British patent specification No. 644,248, published by the British Patent Office on October 11, 1950, the mould is drawn through a rigid collar whereby the moulded article is stripped therefrom at the same time as a bag that covered the mould during the forming operation is peeled from inside of the moulded product. None of these methods of removing the core moulds from short moulded products are satisfactory for removing the core from a product having a long hollow characteristic, such as a long thin-walled pipe.

This invention overcomes the difficulty that has stood in the way of the extension of the vacuum vat moulding and other core moulding methods to the moulding of long hollow articles for at least 30 years, by providing efficient and effective means for removing such moulded articles from the core moulds upon which they are formed.

According to the invention a body of moulding material is built up on the outer surface of a liner of a limp material that covers a rigid core moulding form and, after the moulding materials are consolidated, the rigid core is withdrawn from one end of the liner while retaining the liner in place within the body of moulding material.

The invention will be clearly understood after reference to the following detailed specification read in conjunction with the drawings.

Figure 1:
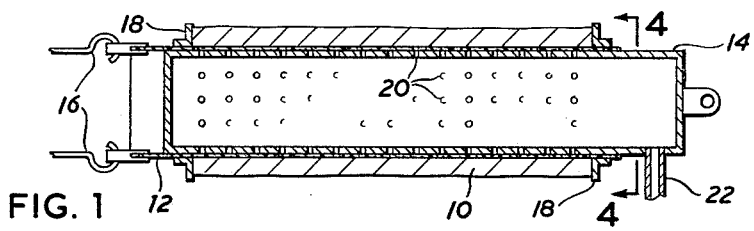
FIGURE 1 is a cross sectional view of a moulded tube formed upon a liner of a limp material that overlays a rigid tubular core mould.
Figure 2:
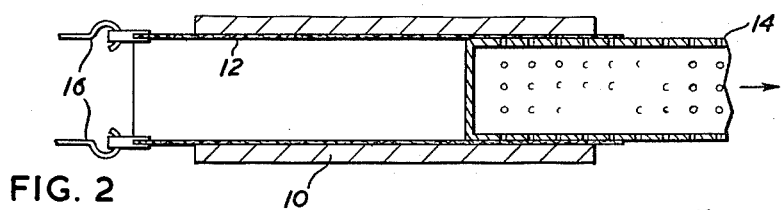
FIGURE 2 shows the rigid tubular core mould being withdrawn through the open ended liner.

Referring initially to the preferred embodiment of the invention as shown in FIGURES 1 to 4 of the drawings, there is shown a body of moulding material 10 formed into the shape of a tube having a rectangular cross section on an open ended liner 12 of a limp material such as a knitted or woven textile material that covers the side wall surface of a rigid tubular core mould 14.

The body of moulding material 10 can be of various make-up and after it has been applied in the form of a tube of the required thickness it is consolidated so that it will hold its shape after the mould form is removed.

The critical part of this method of forming tubes is the withdrawal of the rigid tubular core mould 14. This is effected by withdrawing the mould 14 through the open ended liner 12 as the liner is retained in place within the body of moulding materials.

In the embodiment of the invention illustrated in FIGURES 1 to 4 one end of the liner 12 is retained by hooks 16 while the core mould 14 is withdrawn from the other open end thereof.

The numeral 18 refers to deckle rings which encircle the liner adjacent each of its ends to define the ends of a moulded tube. They are hinged as at 17 so that upon release of the clamps 19 they can be swung open and removed from the mould after the body of moulded materials 10 which forms the tube has been consolidated as will be evident from FIGURE 2.

Figure 3:
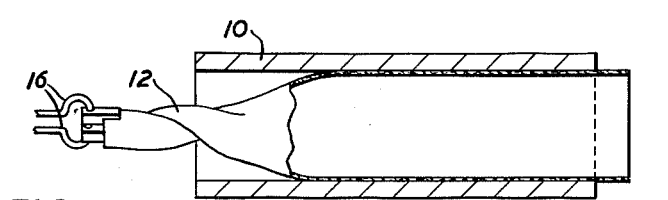
FIGURE 3 shows the moulded article with the rigid core mould removed and the liner being removed by twisting at one end.
Figure 4:
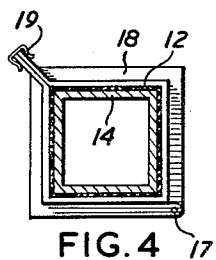
FIGURE 4 is a sectional view along the line 4—4 of FIGURE 1.

After the core mould 14 has been withdrawn from the liner 12 the liner is peeled from the inside of the moulded tube 10. In FIGURE 3 I illustrate a suitable method for doing this in which the end of the liner retained in the hooks 16 is rotated to twist the liner 12 about its own longitudinal axis.

The body of moulding material 10 can be built up upon the liner 12 by means of a variety of moulding methods. The side wall surfaces of the core mould 14 over which the moulded tube 10 is formed are foraminous as indicated by the many holes 20 and, in the case illustrated in FIGURES 1 to 4, the body of moulding material 10 is applied to the liner 12 by means of the well known vacuum process. As is well known to those skilled in the art, in order to build up a body of moulding material according to this process, one would connect a hose to the conduit 22 through which a vacuum could be applied to the interior of the core mould 14 so that when the unit is lowered into a vat filled with slurry, a body of fibrous or other moulding material is deposited on the outer surface of the pervious liner 12 as illustrated.

When the desired thickness of moulding material has been deposited upon the liner the mould assembly is removed from the slurry and suspended in air with the application of vacuum continued until the body of moulding material that comprises the moulded article is sufficiently dewatered and so consolidated or strengthened.

The mould assembly is then disconnected from the vacuum line and the deckle rings 18 detached and, either immediately thereafter or subsequently, the rigid tubular core mould 14 is withdrawn longitudinally of itself through the open ended liner 12 as described above.

Typical materials suitable for moulding from a slurry by the vacuum method in a vat include certain fibrous materials such as woodpulp, jute and other plant fibres, asbestos and similar mineral fibres, rayon, glass wool and other synthetic fibres; certain granular materials such as Portland cement, gypsum and coarse clay; and a variety of combinations of these materials which may be further combined with certain emulsifiable materials such as colloidal resins and waxes deposited on the granules and/or fibres. These materials are generally characterized by a size or shape factor which will permit them to be effectively suspended in water or the desired alternative suspending fluid, and at the same time permit a flow of said suspending fluid through the layer of particles being deposited on the mould elements.

The limp liner 12 may be impervious, where the moulding process is not the vacuum process, and made from sheet plastic films such as plasticized polyethylene and polyvinyl resins, or pervious and knitted or woven from textile materials such as wool, cotton, rayon, nylon, asbestos and glass fibre. The object in using the liner is to provide an alternative surface which is slidable along the inner rigid core during removal, and strong enough to resist separation due to the forces used in removal, thus preventing the rupture and marking of the inner surface of the moulded tube, and the possible destruction by rupture of the entire moulded body. Non stretch materials such as woven cloth are preferred over stretchy materials such as knitted cloth which tends to shrink in the peripheral direction and tighten on the inner core when pulled and stretched longitudinally. Longitudinal stretch of the liner material should also be kept within the stretch tolerance of the consolidated moulding materials at the time of removal in order to prevent rupture or cracking of the moulded tube.

The limp characteristic of the liner is important in the final removal of the liner by peeling it away from the inner surface. The peeling action essentially comprises a method of lifting the sheet material of the liner away from the surface of the moulded material starting at an end or an edge, the force of separation being thus substantially limited at any moment to a small area along the line at which the peeling is taking place.

Figure 5:
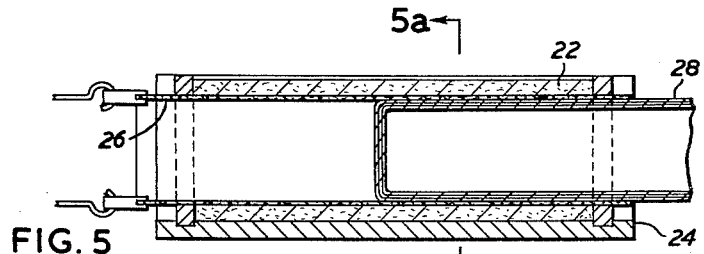
FIGURE 5 is a cross sectional view showing a rigid core mould being withdrawn from an open ended liner of a limp material in which the body of moulding material that forms the moulded tube has been formed by filling in between an enclosing mould and the liner.

In FIGURE 5 I have indicated an alternative manner for forming a body of moulding material into a tube. In this instance a moulded tube is formed by filling the space between an enclosing form 24 and a liner of limp material 26 similar to the liner 12 that overlays the side walls of a rigid tubular core mould 28 with a body of moulding material 22. After consolidating the material 22, the core mould 28 is withdrawn by retaining one end of the liner 26 as described above.

Typical materials for moulding by filling between core moulds and an enclosing form include Portland cement concrete, gypsum plaster and pottery clay.

Figure 6:
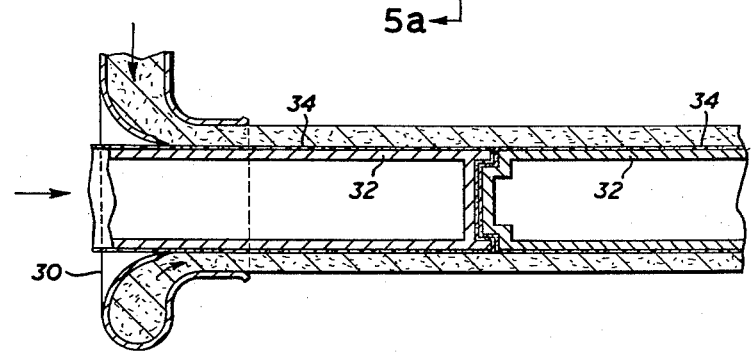
FIGURE 6 shows a continuous supply of core moulds with liners thereon being pushed through an extruding head whereby a body of moulding material is built up over the liners.

FIGURE 6 shows a still further method of applying moulding material in tube form to a core mould. In this case the materials are extruded from the annular orifice of the extruding head 30 on to a series of core moulds 32 each having a liner 34 of limp material as they are pushed through the head. The core moulds are suitably supported and are separable after passage through the head 30. Following separation the core moulds 32 are withdrawn from the liners 34 as the liners are retained as described above.

Typical materials for moulding by extruding from a nozzle around a core mould include gypsum plaster, pottery clay and Portland cement mortar.

Typical materials suitable for making the resilient sleeves include sheet plastics such as rigid polyvinyl chloride or epoxy resin, sheet metals such as stainless steel or bronze, or stiff woven mesh made of metal wire or heavy rigid plastic filament. The sheet materials may be dimpled on the inside or otherwise deformed to make them more slidable on the inner rigid core, and they may be perforated for use with foraminous moulds in a vacuum moulding system.

Figure 7:
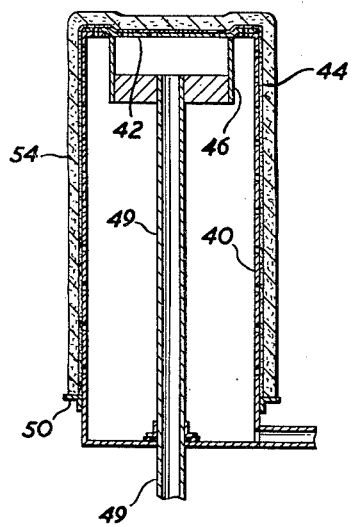
FIGURE 7 is a cross sectional view of a moulded receptacle formed upon a rigid tubular core mould that has a rigid cover for one end thereof and a liner of limp material.
Figure 8:
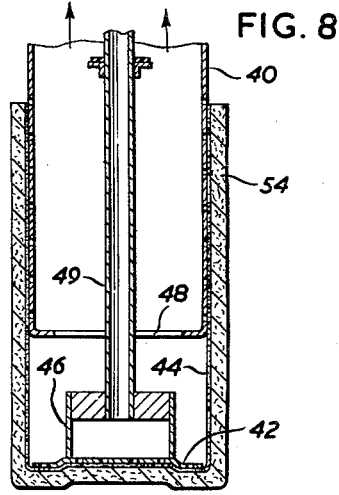
FIGURE 8 is a cross sectional view showing a rigid tubular mould section of FIGURE 7 being withdrawn from the open ended liner while the liner is restrained by the rigid cover for the rigid tube.
Figure 5A:
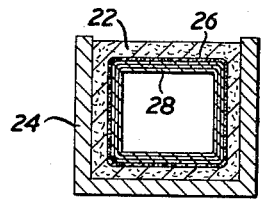
FIGURE 5A is a section at the line 5A—5A of FIGURE 5.

In FIGURES 7 and 8 the manner of moulding a tubular receptacle is illustrated. The core mould in this case comprises a rigid tubular core section 40 and a rigid cover 42 for one end thereof which is separable therefrom in the direction of the longitudinal axis thereof. A liner 44 extends over both mould sections. A shank 46 extends upwardly from the bottom 42 and through the glanded orifice in the tubular section 40 as at 48. A deckle ring 50 extends around the side wall of the tubular mould element 40 as illustrated.

The mould illustrated in FIGURES 7 and 8 is for use with the vacuum process and the numeral 52 indicates a lead nipple for a vacuum line to the tubular section 40. A vacuum line is also connected to the tube 49 for the bottom section 42 of the mould.

In use as vacuum is applied to the mould in the slurry vat, a body of moulding material 54 is caused to adhere to the liner 44 as shown to form a receptacle having tubelike sides.

In order to remove the mould from the product after it has been moulded and consolidated in the usual way the inside of the liner 44 is retained by means of a downward pressure on the rigid end mould element 42 and the rigid tubular core section of the mould is drawn upwardly through the open ended liner as indicated in FIGURE 8.

Following removal of the mould section 40 the mould section 42 is removed and the liner is stripped from the moulded product.

Figure 9:
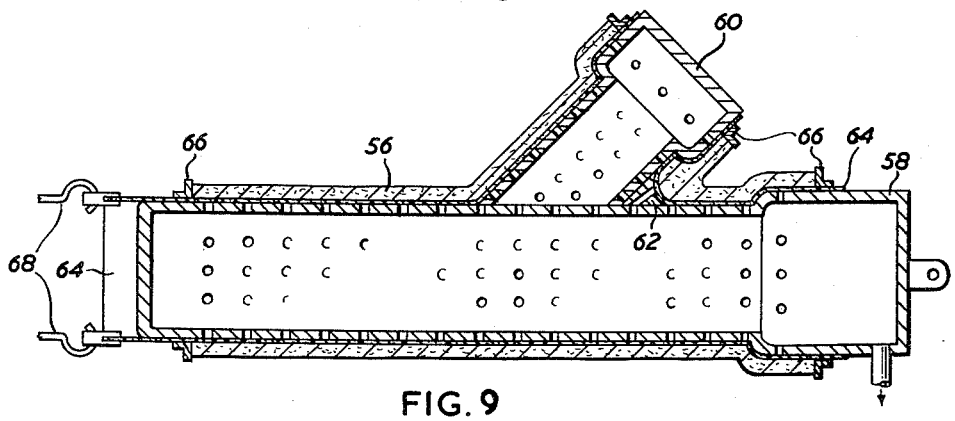
FIGURE 9 is a cross sectional view of a moulded pipe or duct branch fitting formed upon a rigid tubular core mould having a liner of flexible material.

In FIGURE 9 there is illustrated a body of moulding material 56 formed into a moulded pipe fitting. The moulding form in this case comprises a main inner rigid core mould 58, a branch inner rigid mould element 60, and a fillet inner rigid mould element 62. A liner 64 of limp material extends over the composite mould and detachable deckle rings 66 form the ends of the moulded product. For removal of the inner rigid core, elements 60 and 62 in that order are first withdrawn through the open end of the branch side of the liner 64, the cover branch meanwhile being retained in place by reason of its attachment at the other end to the remainder of the liner. Then the main core mould 58 is withdrawn through the open end of the main run of duct while the liner 64 is retained by the hooks 68 as described more fully above. Finally the liner is stripped from the moulded product.

Figure 10:
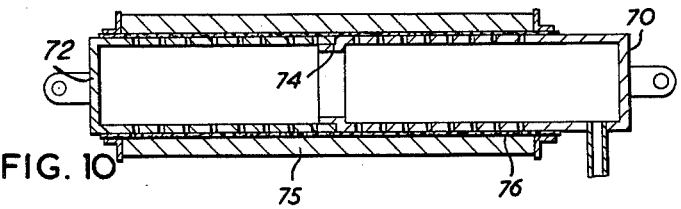
FIGURE 10 is a sectional view of a rigid tubular core mould, the core mould being separable in the direction of the longitudinal axis thereof.

FIGURE 10 shows a rigid tubular core mould comprising sections 70 and 72 separable in the direction of the longitudinal axis of the mould at a cross section as at 74. A liner of limp material 76 is applied to the rigid core mould and in use, as before, a body of moulding material 75 is built up on the liner to form a tube or the like. In this case, the inner core mould sections 70 and 72 are simultaneously drawn from the open ends of the liner 76 while the moulded product remains stationary.

It will be noted that the two mould sections 70 and 72 are substantially the same length and that as the two core sections are simultaneously withdrawn from opposed ends of the liner, the liner is retained within the body as the equal in magnitude but opposite in direction forces applied to withdraw the halves of the rigid mould core are balanced within the liner.

Figure 12:
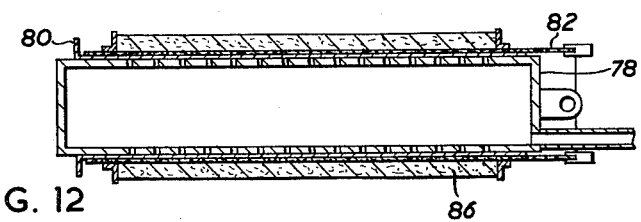
FIGURE 12 shows a rigid tubular core mould comprised of a rigid section and an outer resilient sleeve therefor.

In FIGURE 12 the mould shown comprises a rigid core 78 and a resilient sleeve like cover 80. A liner of limp material 82 is used over a flexible sleeve 80.

In use a body of moulding material 86 is built up on the liner 82 as before and the mould is removed. In order to remove the mould, the rigid core 78 is first slid from an open end of the resilient sleeve as the sleeve is retained against movement by gripping an end thereof. The resilient sleeve 80 is then withdrawn from the liner 82 as the liner is retained in place within the body of the moulding material as described above. Finally the liner is stripped from the body of moulding material.

This method has advantage where withdrawal of the core from the liner is difficult or inconvenient due to conditions of weight or length or time. For example, the materials of the resilient liner and the inner rigid core can be selected such that they slide easily one over the other to provide for easy removal of the inner core and the sleeve 80, being flexible, is then more easily removed from the liner than a rigid core would be. Further under certain circumstances where the thickness and nature of the materials from which the moulded tube is made are such as to require support against warping or other deformation during an extended drying or setting period, the resilient sleeve can be designed to give sufficient rigidity to provide the required support during the setting of the moulded body so that the more expensive inner core can be removed and returned earlier to the moulding machine for further use.

Figure 13:
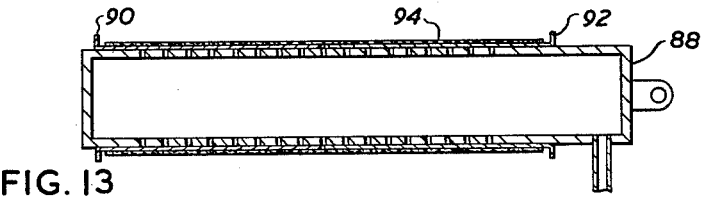
FIGURE 13 is a sectional view of a rigid tubular core mould similar to the mould shown in FIGURE 12 except that the resilient sleeve thereof is divided into two approximately equal lengths.
Figure 11:
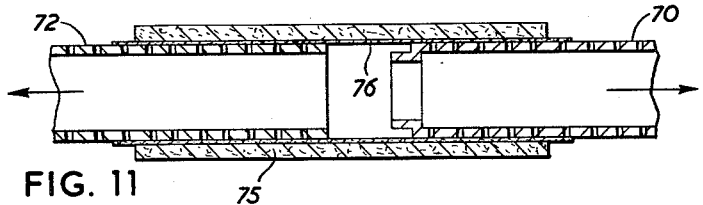
FIGURE 11 shows the core moulds of FIGURE 10 partially withdrawn.

In FIGURE 13 there is illustrated a further embodiment of a multi-layer core mould. In this case the rigid core 88 has a resilient sleeve formed from two similar sections 90 and 92. These sections are approximately equal in length and separable from each other in the direction of the longitudinal axis of the sleeve. The liner 94 extends over both sections.

In use, a body of moulding material is deposited on the liner 94 and the rigid core section 88 is withdrawn from the flexible sleeve section. The sections of the sleeve 90 and 92 are then withdrawn from the liner by withdrawing the two sections 90 and 92 thereof simultaneously from each end of the liner, the liner being retained within the body of moulding material thereon as the equal and opposite forces applied to withdraw the two sleeve sections are balanced within the liner.

The one piece inner core has the advantages of greater strength then the two piece inner core. When moulding processes other than the vacuum process are used the resilient sleeve of the core mould of FIGURES 12 and 13 can be made from metal wire mesh, dimpled or ribbed sheet metal or sheet plastics. If the vacuum process is to be used the mould sleeve must be pervious and can be made of sheet metal or sheet plastics perforated to permit the passage of fluid through the mould.

What I claim as my invention is:

1. In a method of moulding an article having a long tubular void from a moulding material which is consolidatable in predetermined shape about a core mould in which shape said article is of such thinness as to be rupturable by normal withdrawal of said core mould prior to final setting, the improvement which comprises placing around said rigid core mould for the long tubular void a liner of a limp material slidable with respect to the core mould and having no stretch longitudinally of the core mould and having at least one open end through which the core mould can pass, forming and consolidating a rupturable body of moulding material of said shape and thinness about said liner, after said moulding material is consolidated but while it is still rupturable by the force of removal of the core mould sliding said core mould from said liner without stretching said liner longitudinally of the core mould while retaining said liner in place within said body of moulding material thereby separating said core mould from said body without rupturing said body, then peeling said liner from said body of moulding material and then permitting said body to finally harden.

2. In a method of moulding an article having a long tubular void from a moulding material which is consolidatable in predetermined shape about a core mould in which shape said article is of such thinness as to be rupturable by normal withdrawal of said core mould prior to final setting, the improvement which comprises placing around said rigid core mould for the long tubular void a liner of a limp material slidable with respect to the core mould and having no stretch longitudinally of the core mould and having at least one open end through which the core mould can pass, forming and consolidating a rupturable body of moulding material of said shape and thinness about said liner, after said moulding material is consolidated but while it is still rupturable by the force of removal of the core mould sliding said core mould from said liner without stretching said liner longitudinally of the core mould while retaining said liner in place within said body of moulding material at those portions of said body from which said core mould has not yet been removed thereby separating said core mould from said body without rupturing said body, then peeling said liner from said body of moulding material and then permitting said body to finally harden.

3. The method of moulding an article having a long tubular void as claimed in claim 1 in which said liner is retained as aforesaid by gripping said liner adjacent the end opposite the end that said mould is withdrawn through as aforesaid.

4. A method of moulding an article having a long tubular void as claimed in claim 1 in which said rigid core mould has a body having sides to form the side walls of a tubular void and an end cover for said body to form the bottom of a tubular void, said body and said cover being separable in the direction of the longitudinal axis of said body, said liner being open at one end only and being placed over the rigid core as aforesaid to cover the side walls of said body and said cover, and in which said core mould is withdrawn from said liner while retaining said liner in place within said body of moulding material as aforesaid by withdrawing said body through the open end of said liner while exerting a force against said cover, and then withdrawing said cover from said liner.

5. A method of moulding an article having a long tubular void as claimed in claim 1 in which said tubular rigid core mould is separable into two halves at approximately mid length, said liner being open at both ends, and in which said core is withdrawn as aforesaid by withdrawing one of said halves of said core simultaneously from each end of said liner cover and in which said liner is retained within said body as aforesaid as the equal and opposite forces for withdrawing the two halves of said rigid core mould in opposite directions are balanced within said liner.

6. A method of moulding an article having a long tubular void as claimed in claim 1 in which said core mould comprises a risilient sleeve and a rigid inner section slidable in said sleeve, and in which said core is withdrawn from said body of moulding material as aforesaid by firstly withdrawing said rigid inner section from said sleeve section after said moulding materials are applied and secondly by withdrawing said sleeve from said liner while retaining said liner in place within said body of moulding material as aforesaid.

7. A method of moulding an article having a long tubular void as claimed in claim 6 in which said sleeve of said mould is separable in the direction of its longitudinal axis in two halves at approximately mid length, said liner being open at both ends, said sleeve of said mould being withdrawn from said liner as aforesaid by withdrawing one of said halves thereof simultaneously from each end of said liner, said liner being retained within said body as aforesaid as equal and opposite forces for withdrawing the two halves of said sleeve in opposite directions are balanced within said liner.

References Cited in the file of this patent

UNITED STATES PATENTS

| | | |
|---|---|---|
| 100,705 | Kleckner | Mar. 8, 1870 |
| 763,333 | Stevens | June 21, 1904 |
| 895,904 | Smyth et al. | Aug. 11, 1908 |
| 1,076,229 | Priest | Oct. 21, 1913 |
| 1,348,332 | Stremel | Aug. 3, 1920 |
| 1,408,685 | Benson | Mar. 7, 1922 |
| 1,412,392 | Earley | Apr. 11, 1922 |
| 1,423,983 | Woolcock | July 25, 1922 |
| 1,586,603 | Brown | June 1, 1926 |
| 1,598,059 | Cykler | Aug. 31, 1926 |
| 1,991,256 | Muntz | Feb. 12, 1935 |
| 2,114,794 | Bratring | Apr. 19, 1938 |
| 2,234,784 | Stolz | Mar. 11, 1941 |
| 2,261,247 | Girard | Nov. 4, 1941 |
| 2,312,587 | Price | Mar. 2, 1943 |
| 2,393,765 | Gilliam | Jan. 29, 1946 |
| 2,474,721 | Billner | June 28, 1949 |

FOREIGN PATENTS

| | | |
|---|---|---|
| 52,725 | Germany | July 14, 1890 |
| 2,065 | Switzerland | Mar. 31, 1890 |